March 30, 1948.  G. W. JOHNSON  2,438,608
POULTRY SHACKLE
Filed July 29, 1944
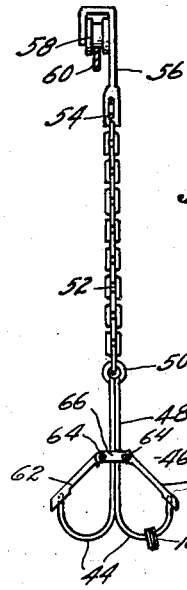
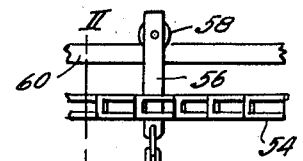
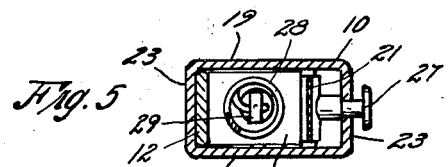
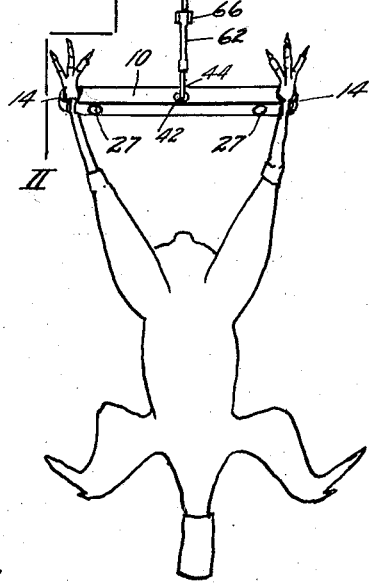
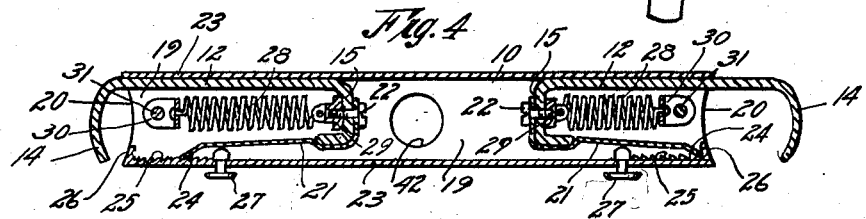
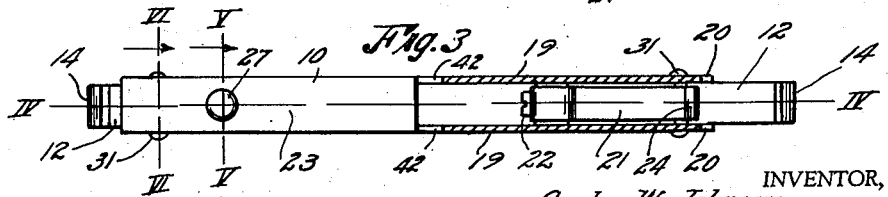
INVENTOR,
Gordon W. Johnson.
BY Roy E. Hamilton,
Attorney.

Patented Mar. 30, 1948

2,438,608

UNITED STATES PATENT OFFICE 2,438,608

POULTRY SHACKLE

Gordon W. Johnson, Overland Park, Kans., assignor to Gordon Johnson Company, Kansas City, Mo., a corporation of Missouri Application July 29, 1944, Serial No. 547,214

3 Claims. (Cl. 17—44.1)

1

This invention relates to improvements in poultry shackles and has particular reference to poultry shackles suitable for use on conveyor lines.

The principal object of the present invention is the provision of a poultry shackle having leg engaging means which will firmly engage the bird's legs when the bird is on the line and also when detached from the line for special operations.

Another object is the provision of a poultry shackle which is so constructed as to serve as a handle for supporting the bird when off the line.

Other objects are simplicity and economy of construction, ease and efficiency of operation, and a shackle that may be quickly and easily removed from the chain of the conveyor system.

With these objects in view as well as other objects which will appear during the course of the specification, reference will be had to the drawing wherein:

Fig. 1 is a perspective view of the poultry shackle embodying this invention and disposed in the operative position on a conveyor system.

Fig. 2 is a sectional view taken on line II—II of Fig. 1.

Fig. 3 is an enlarged elevational edge view of the poultry shackle detached from the conveyor, with parts in section.

Fig. 4 is a longtudinal sectional view taken on line IV—IV of Fig. 3.

Fig. 5 is a cross sectional view taken on line V—V of Fig. 3.

Fig. 6 is a cross sectional view taken on line VI—VI of Fig. 3.

Throughout the several views like reference characters refer to similar parts and the numeral 10 designates a body member which is tubular in form and of a size and shape suitable to serve as a handle or hand grip whereby the operator may conveniently handle the bird when it is not on the conveyor line.

Opposite end portions of the tubular member are provided with like leg gripping means which are slidably adjustable to engage the legs of the bird and hold them in spread apart relation.

A slidably mounted hook insert 12 comprises a strip of metal and is rebent adjacent its opposite ends to form end hooks 14 and 15. Hook 14 protrudes outwardly from said tubular member and serves as one side of the bird leg gripping means. The hook 15 at the inner end portion of the strip serves as an anchor for an operating spring 28 and for the latch spring 21. Hooks 14 are spaced outwardly from the respective ends of body member 10 to permit the insertion of the

2 bird's legs therebetween. The side walls 19 of body member 10 are recessed at 20 to form depressions to receive the fowl's legs. A leaf spring 21 secured to hook 15 by means of screw 22 is formed so as to be in spaced relation to the edge wall 23 of the body member 10 with its free end offset at 24 to engage a series of ratchet teeth 25 carried by said edge wall. The tension of spring 21 is so adjusted that it constantly urges the hook insert against the opposite edge wall of the body member. The ratchet teeth 25 may be integral with edge wall 23 or may be formed on a separate bar which is securely attached thereto. A stop 26 adjacent the end of body member 10 and disposed in the path of travel of the spring offset 24 serves to limit the outward movement of the hook insert.

A release button 27 slidably mounted in edge wall 23 is so positioned that it will be movable to engage the body of leaf spring 21 and move the offset portion thereof from engagement with the ratchet teeth 25 to permit outward movement of the hook insert. This hook insert is constantly urged to the outer position by means of a coil spring 28 which is attached at its one end to a nut 29 secured to screw 22 and at its other end to a yoke 30 which in turn is anchored to the body member 10 by means of pin 31. This spring 28 is always under tension, thus serving to urge member 12 outwardly.

Referring to Fig. 4, it will be noted that the hook insert at the right side is in the open position to receive the leg of the fowl. When the leg has been inserted between the end of the body member 10 and hook 14, the operator simply presses the hook insert inwardly against a fowl's leg, not shown, until it is in the position shown at the left hand end of the body member. When so positioned, the leaf spring 21 will engage the ratchet teeth 25 as shown thus preventing an outward movement of the hook insert. The leg may be released by pressing the release pin 27 to disengage the offset portion of spring 21 from the ratchet 25. The spring 28 is always under tension and will contract to move the hook insert outwardly until the leaf spring 21 engages stop 26.

It will be noted that each end of the shackle is provided with similar leg engaging means and that they are independently operable to engage or disengage the fowl's legs. During the picking operation it is sometimes found convenient to remove the fowl from the traveling line and in such cases the operator grasps the body member 10 for supporting the fowl. In such cases the operator's hand will be positioned adjacent the release pins 27 but will not move the same a sufficient distance to release the leaf spring 21. This is due to the fact that the release pins are positioned adjacent the center of a substantially flat side wall and are limited in their movement to a distance just sufficient to move the leaf spring 21 from engagement with ratchet teeth 25. When the fowl's leg is to be released, it is necessary for the operator to press inwardly on a release pin and move it its full distance of travel.

Each of the side walls of the body member 10 is provided with an opening 42 which serve to receive the hook 44 of the twin hook member 46. This hook member 46 comprises like twin hooks 44 carried by a stem 48 and an eye 50 to receive one end of a supporting chain 52 secured to the line chain 54 which in turn is supported by a bracket 56 carrying a roller 58 operatively mounted for movement on a track 60. In order to prevent accidental engagement of hooks 44 with parts of the apparatus during the operation, hinged guard members 62 are pivoted at 64 to cross bar 66 rigidly carried by stem 48. These guards 62 overlap the ends of the hooks 44 so that as the conveyor is operated to drag the fowl through certain chutes during the dressing operation, the hooks 44 will be protected against engagement with any of the protruding parts. The normal position of the fowl on the shackle is shown in Fig. 1 and it is the purpose of this shackle not only to support the bird on the conveyor but to serve as a handle by means of which the bird may be handled without any danger of the legs becoming disengaged. The type of shackles now in general use is so constructed that when the weight of the bird is not exerted against the shackle, the shackle may fall from position and become disengaged. It will be noted that the body member 10 is substantially rectangular in cross section without any protruding parts, thus presenting a suitable hand grip for all practical purposes.

The double hooks 44 are provided for convenience of the operator. When the conveyor system is in normal operation only one of the hooks 44 of each pair is filled so that the operator always has available at least one empty hook on which to deposit the detached fowl that he has been working on. Should there be but one hook 44, as is the present practice, at each stage of the conveyor, then it might be necessary for the operator to first remove a carcass from the hook before the other one could be placed thereon, thereby requiring the use of both hands of the operator to make the change.

Another feature of this shackle is the fact that the working parts are substantially housed by the body member 10 and are adapted to be easily cleaned by forcing a stream of water through the body member.

What I claim as new and desire to be secured by Letters Patent is:

1. A poultry shackle comprising an elongated body member having recessed ends, a hook insert slidably mounted in each of the opposite end portions respectively of said body member with the hook portion thereof extending outwardly from the adjacent recessed end of said body member to receive a fowl's leg therebetween, a stop to limit the outward movement of said hook insert, resilient means positioned to constantly urge said hook insert outwardly against said stop, a spring means to normally secure said hook insert in the operative engaging position, and a release button extended through the wall of said body member, manually operable from outside the body member to release said hook securing spring.

2. A poultry shackle comprising an elongated tubular body member, a hook insert slidably mounted in each of the opposite end portions respectively of said body member with the hook portion thereof extending outwardly from the adjacent end of said body member, a stop to limit the outward movement of said hook insert, resilient means positioned to constantly urge said hook insert outwardly against said stop, and resilient means carried by said hook insert and adapted to engage ratchet teeth carried by said body member to hold said hook insert in a predetermined operative position against the urge of said resilient means and to urge said hook insert against the inner wall of said tubular body member.

3. A poultry shackle comprising an elongated tubular body member having its opposite ends open, a hook insert slidably mounted in each of the opposite end portions respectively of said body member with the hook portion thereof extending outwardly from the adjacent end of said body member, a plurality of longitudinally spaced apart stops carried by said body member adjacent its opposite ends, a flat spring secured to each of said hook inserts to tension the respective hook inserts in said body member and to engage a selected one of said stops, resilient means to urge said hook inserts outwardly and said springs against certain of said stops, and means manually operated to release said flat springs from said stops whereby to permit longitudinal adjustment of said hook members in said body member and to fix said hook inserts in certain predetermined positions.

GORDON W. JOHNSON.

REFERENCES CITED

The following references are of record in the file of this patent:

UNITED STATES PATENTS

| Number | Name | Date |
|--------|------|------|
| 1,678,936 | Egbert | July 31, 1928 |
| 1,742,569 | Barker et al. | Jan. 7, 1930 |
| 1,796,739 | Williams | Mar. 17, 1931 |
| 2,152,083 | Onorato et al. | Mar. 28, 1939 |
| 2,235,619 | McMahan et al. | Mar. 18, 1941 |